May 4, 1943.  A. F. ANJESKEY  2,318,354
MONORAIL TRACTOR
Filed Dec. 11, 1941  2 Sheets-Sheet 1

INVENTOR.
ALPHONSE F. ANJESKEY
BY Kwis Hudson & Kent
ATTORNEYS

May 4, 1943.  A. F. ANJESKEY  2,318,354
MONORAIL TRACTOR
Filed Dec. 11, 1941    2 Sheets-Sheet 2

INVENTOR.
BY ALPHONSE F. ANJESKEY
Kwis Hudson & Kent
ATTORNEYS

Patented May 4, 1943

2,318,354

UNITED STATES PATENT OFFICE 2,318,354

MONORAIL TRACTOR

Alphonse F. Anjeskey, Cleveland, Ohio, assignor to The Cleveland Crane & Engineering Company, Wickliffe, Ohio, a corporation of Ohio Application December 11, 1941, Serial No. 422,529

9 Claims. (Cl. 105—153)

The present invention relates to electrified overhead monorail underslung carrier systems, and more particularly to tractors and tractor-carriers for use with or on such systems.

The principal object of the invention is the provision of a novel tractor or tractor-carrier adapted to operate on an electrified overhead monorail system and be propelled thereabout by a traction wheel or traction wheels engaging the underside of the rail and so constructed and supported that the center of the tread portion of the traction wheel or wheels substantially contacts or aligns with the center of the rail at all times, that is, while the tractor or tractor-carrier is traveling along a curved portion or section of track as well as while the tractor or tractor-carrier is traveling along straight portions or sections of track.

Another object of the present invention is the provision of a novel and improved tractor or tractor-carrier for an electrified overhead monorail underslung carrier system the traction wheel or wheels of which engage the underside of the rail and are pivotally connected to the frame in such a manner that the center of the tread or treads thereof always contacts or aligns with the center of the rail irrespective of whether the tractor or tractor-carrier is traveling along a straight or a curved portion or section of track.

The present invention resides in certain details of construction and combinations and arrangements of parts, and further objects and advantages thereof will be apparent to those skilled in the art to which the invention relates from the following description of the preferred embodiment thereof described with reference to the accompanying drawings forming a part of this specification in which similar reference characters designate corresponding parts throughout the various views, and in which.

Figure 1:
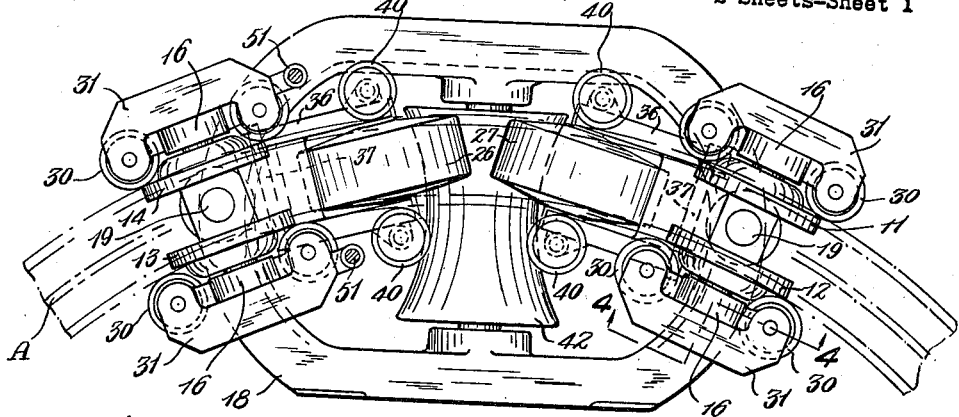
Fig. 1 is a plan view of a tractor for an electrified overhead monorail underslung carrier system embodying the present invention with the rail shown in dot-dash lines and current collectors omitted for clearness.
Figure 2:
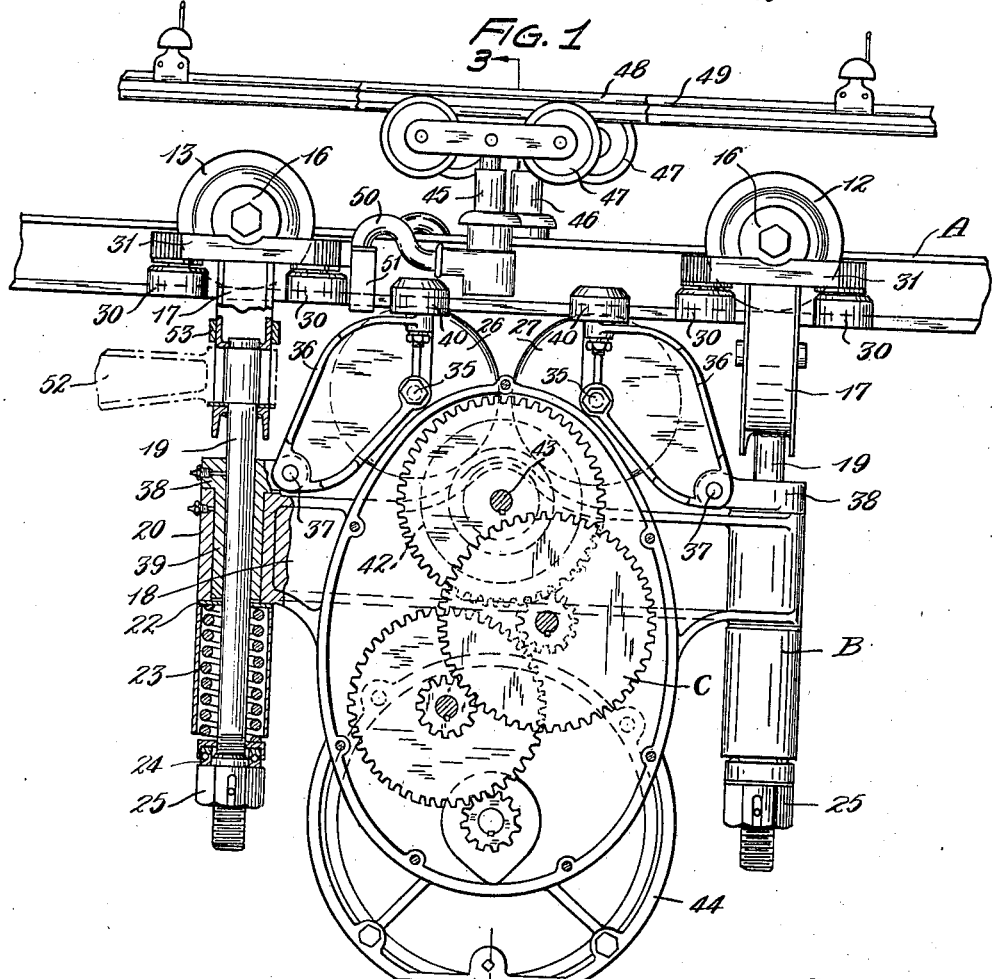
Fig. 2 is a side elevational view, with portions broken away, of the tractor shown in Fig. 1.
Figure 3:
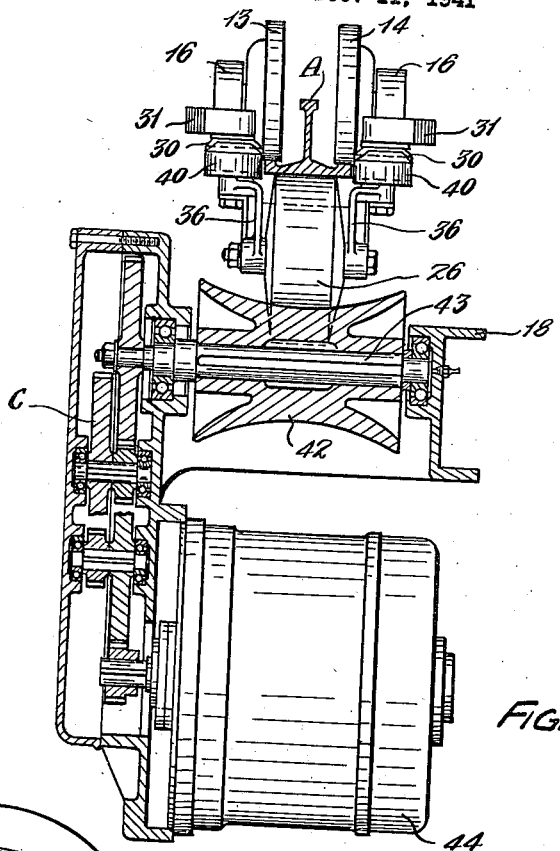
Fig. 3 is a section approximately on the line 3—3 of Fig. 2, with the current collectors omitted and portions shown in elevation.
Figure 4:
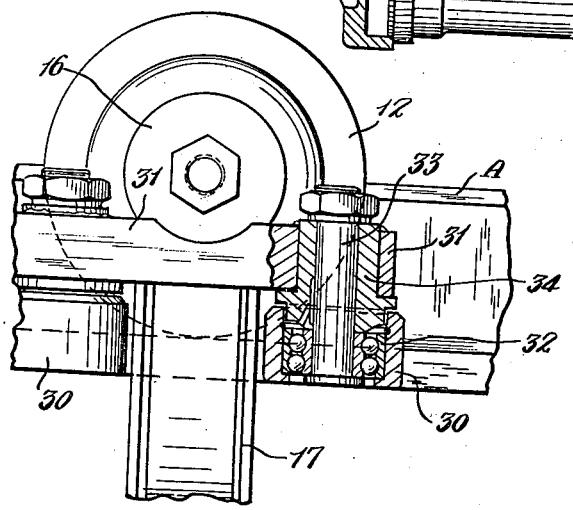
Fig. 4 is an enlarged view of a portion of Fig. 2 with parts in section approximately on the line 4—4 of Fig. 1.

Referring to the drawings, the reference character A designates an overhead monorail of inverted T-shaped cross-section upon which an underslung tractor B embodying the present invention is movably supported by two pairs of wheels 11, 12 and 13, 14 located at opposite ends of the tractor, which wheels engage raised tread portions of the rail A. The raised tread portions of the rail are located at opposite sides of the central vertical flange through the medium of which the rail is suspended from an overhead support in any convenient manner. Both pairs of supporting wheels 11, 12 and 13, 14 are similar in construction and connected to the frame of the tractor in like manner.

Each of the supporting wheels 11, 12, 13, and 14 is rotatably supported by a suitable anti-friction bearing on a short shaft carried by a member 16 welded or otherwise secured to the upper ends of the U-shaped members 17 located at opposite ends of the tractor. The member 18 which is the principal frame member of the tractor is connected to or suspended from the members 17 by rods or shafts 19. In the embodiment shown the rods or shafts 19 are welded to the members 17 but other means for securing the parts together may be employed.

Opposite ends of the member 18, which are provided with suitable bosses 20 having apertures therein through which the rods or shafts 19 project, rest upon washers 22 surrounding the rods or shafts 19 and interposed between the lower ends of the bosses 20 and the upper ends of coil springs 23 which also surround the rods or shafts 19. Movement of the coil springs 23 along the shafts 19 in a downward direction is prevented by thrust bearings 24 interposed between the lower end of the spring 23 and nuts 25 threaded on the lower ends of the shafts 19. The springs 23 continuously urge the member 18 in an upward direction, thus keeping the traction wheels 26, 27 hereinafter more specifically referred to in contact with the underside of the rail A. The pressure with which the traction wheels 26, 27 engage the underside of the rail can be adjusted by means of the nuts 25.

The rods or shafts 19 are rotatable within the bosses 20 relative to the member 18, and the pairs of supporting wheels 11, 12 and 13, 14 at opposite ends of the tractor, which wheels, as shown, are flangeless, are caused to follow or align with the longitudinal center line of the rail at the place where they are in engagement therewith by guide rollers 30 rotatably connected to opposite ends of members 31 welded or otherwise fixed to the U-shaped members 17 adjacent to the members 16. As shown, the rollers 30 are rotatably connected by means of anti-friction bearings 32 to the lower end of short vertical shafts 33 fixed in bushing members 34 which members are in turn secured in the members 31. The guide rollers rotate and engage the edges of the rail A. The two members 31 associated with each pair of supporting wheels are located on opposite sides of the rail A and the two guide rollers carried by each are located one ahead and one behind the axis of rotation of the respective supporting wheels with which they are associated. The construction is such that each pair of supporting wheels is caused to follow the rail A independently of the other pair.

The traction wheels 26, 27 are rotatably carried by bolts or shafts 35 secured in the forked ends of bracket members 36 pivotally connected for rotation about a horizontal axis by bolts 37 to bosses formed integral with the upper ends of members 38 rotatably connected to the shafts 19. As shown, the members 38 have downwardly extending tubular projections 39 interposed between the rods or shafts 19 and the member 18. The particular construction shown provides a relatively long bearing for the members 18 and 38 without unduly increasing the overall height of the tractor. The brackets 36 in which the traction wheels are rotatably supported are provided with guide rollers 40 similar to the guide rollers 30. Each bracket 36 is provided with two guide rollers 40 one on either side of the rail A which rollers guide the traction wheels 26, 27 in such a manner that the center of the tread portion thereof always substantially contacts or coincides with the center line of the rail at the point of engagement therewith.

The traction wheels 26, 27 which are preferably made of rubber or some similar material having a high coefficient of friction but which may be made of any suitable material, continuously engage a concaved drive wheel 42 keyed to a shaft 43 rotatably supported in the member 18. The shaft 43 is driven by an electric motor 44 through reduction gearing, designated generally by the reference character C. The radius of curvature of the drive wheel 42 is such that the traction wheels 26 and 27 maintain contact therewith irrespective of their angular positions. Electric current for the motor 44 is supplied through current collectors 45, 46 of commercial construction having collector wheels 47 which engage conductor bars 48, 49 supported adjacent to the rail A and located at opposite sides of the latter. The current collectors 45, 46 are preferably carried by arms 50 rotatably supported in bosses 51 welded to some convenient part of the frame. As shown, the bosses 51 are welded to the members 31 at the front of the tractor.

The tractor shown is adapted to be connected to a carrier or the like by one or more load bars 52 having apertures in their ends through the medium of which they can be connected to the upper ends of the shafts or rods 19. The load bars 52 are held in position on the shafts or rods 19 by members 53 extending between the upright portions of the U-shaped members 17. However, it is to be understood that the tractor may be connected to a load or carrier in any suitable manner.

The preferred embodiment of the invention shown has been described in considerable detail but it is to be understood that the invention is not limited to the particular construction or embodiment shown. As will be apparent to those skilled in the art to which the invention relates, numerous changes may be made in the construction shown without departing from the invention. For example, the guide wheels 30 may be omitted and flanged supporting wheels employed in place of the flangeless supporting wheels shown. In like manner, one of the traction wheels 26, together with its supporting mechanism including the bracket 36, may be omitted.

While drive and traction wheels of particular form are shown wheels of different form may be employed so long as the requirements of operation are fulfilled. The center of the face of the traction wheel must substantially follow the center of the rail and maintain its contact with the driving wheel irrespective of the shape of the track.

It will also be obvious, as previously stated, that the present invention is applicable to tractor-carriers as well as to tractors per se and, when so embodied, either one or a plurality of traction wheels may be employed, and the word "tractor" as used throughout the appended claims is intended to mean either what is commercially known in the art as a tractor, or what is commercially known in the art as a tractor-carrier.

It is my intention to hereby cover all adaptations, modifications and alternative constructions coming within the spirit and scope of the appended claims. Having thus described my invention, what I claim is:

1. An overhead monorail underslung tractor comprising a frame, supporting wheels connected to said frame and adapted to engage and travel along the upper sides of opposite flanges of an inverted T-shaped overhead monorail, a drive wheel rotatably supported by said frame, said drive wheel having a peripheral surface arcuate in transverse cross-section, a traction wheel having a tread portion adapted to engage the underside of the rail and the arcuate surface of said drive wheel, means for pivotally supporting said traction wheel for rotation about an axis offset from and angularly disposed with respect to its axis of rotation, means for driving said drive wheel, and means for continuously maintaining the center of the tread portion of said traction wheel substantially in line with the center line of the underside of the rail at the point of contact therewith.

2. An overhead monorail underslung tractor comprising a frame, supporting wheels connected to said frame and adapted to engage and travel along the upper surfaces of opposite flanges of an inverted T-shaped overhead monorail, a traction wheel having a tread portion adapted to engage the underside of the rail, means for driving said traction wheel, said last-named means including a peripherally grooved wheel with the grooved portion of which the tread portion of said traction wheel engages, and means for continuously maintaining the center of the tread portion of said traction wheel substantially in line with the center line of the underside of the rail at the point of contact therewith.

3. An overhead monorail underslung tractor comprising a frame, supporting wheels connected to said frame and adapted to engage and travel along the upper surfaces of opposite flanges of an inverted T-shaped overhead monorail, a traction wheel having a tread portion adapted to engage the underside of the rail, a member, means for rotatably supporting said member in said frame for rotation about a vertical axis, means for rotatably supporting said traction wheel in said member for rotation about a horizontal axis, means for driving said traction wheel, and means for continuously maintaining the center of the tread portion of said traction wheel substantially in line with the center line of the underside of the rail at the point of contact therewith.

4. An overhead monorail underslung tractor comprising a frame, supporting wheels connected to said frame and adapted to engage and travel along the upper surfaces of opposite flanges of an inverted T-shaped overhead monorail, a traction wheel having a tread portion adapted to engage the underside of said rail, a member, means for rotatably supporting said member in said frame for rotation about a vertical axis, means for rotatably supporting said traction wheel in said member for rotation about a horizontal axis, offset from said axis of rotation of said member, means for driving said traction wheel, said means including an hourglass-shaped wheel with the grooved portion of which the tread portion of said traction wheel engages, and means for continuously maintaining the center of the tread portion of said traction wheel substantially in line with the vertical center line of the under surface of the rail at the point of contact therewith.

5. An overhead monorail underslung tractor comprising a frame, supporting wheels connected to said frame and adapted to engage and travel along the upper surfaces of opposite flanges of an inverted T-shaped overhead monorail, a traction wheel having a tread portion adapted to engage the underside of said rail, a member, means for rotatably supporting said member in said frame for rotation about a vertical axis, means for rotatably supporting said traction wheel in said member for rotation about a horizontal axis offset longitudinally of the tractor from the vertical axis about which said member is rotatable, means for driving said traction wheel, and means for continuously maintaining the center of the tread portion of said traction wheel substantially in line with the vertical center line of the underside of the rail at the point of contact therewith.

6. An overhead monorail underslung tractor comprising a frame, supporting wheels connected to said frame and adapted to engage and travel along the upper surfaces of opposite flanges of an inverted T-shaped overhead monorail, a traction wheel having a tread portion adapted to engage the underside of said rail, a member, means for rotatably supporting said member in said frame for rotation about a vertical axis, means for rotatably supporting said traction wheel in said member for rotation about a horizontal axis offset longitudinally of the tractor from the vertical axis about which said member is rotatable, means for driving said traction wheel, said means including a drive wheel having a peripheral surface arcuate-shaped in transverse cross-section with which surface the tread portion of said traction wheel engages, and means for continuously maintaining the center of the tread portion of said traction wheel substantially in line with the vertical center line of the under surface of the rail at the point of contact therewith.

7. An overhead monorail underslung tractor comprising a frame, supporting wheels connected to said frame and adapted to engage and travel along the upper surfaces of opposite flanges of an inverted T-shaped overhead monorail, a drive wheel rotatably supported by said frame, said drive wheel having a peripheral surface arcuate in transverse cross-section, a traction wheel having a tread portion adapted to engage the underside of said rail and the arcuate surface of said drive wheel, means for pivotally supporting said traction wheel for rotation about an axis offset from and angularly disposed with respect to its axis of rotation, means for driving said drive wheel, means for continuously urging said traction wheel into contact with the underside of the rail, and means for continuously maintaining the center of the tread portion of said traction wheel substantially in line with the center line of the underside of said rail at the point of contact therewith.

8. An overhead monorail underslung tractor comprising a frame, supporting wheels connected to said frame and adapted to engage and travel along the upper surfaces of opposite flanges of an inverted T-shaped overhead monorail, a drive wheel rotatably supported by said frame, said drive wheel having a peripheral surface arcuate in transverse cross-section, a traction wheel having a tread portion adapted to engage the underside of the rail, and the arcuate surface of said drive wheel, means for pivotally supporting said traction wheel for rotation about an axis offset from and angularly disposed with respect to its axis of rotation, means for driving said drive wheel, means for continuously urging said drive wheel into contact with said traction wheel and said traction wheel into contact with the underside of the rail, and means for continuously maintaining the center of the tread portion of said traction wheel substantially in line with the center line of the underside of the rail at the point of contact therewith.

9. An overhead monorail underslung tractor comprising a frame, supporting wheels connected to said frame and adapted to engage and travel along the upper surfaces of opposite flanges of an inverted T-shaped overhead monorail, a plurality of traction wheels having tread portions adapted to engage the underside of the rail, means for driving said traction wheels, said last-named means including an hourglass-shaped wheel with the grooved portion of which the tread portions of said traction wheels engage, and means for continuously maintaining the center of the tread portions of said traction wheels substantially in line with the center line of the underside of the rail at their points of contact therewith.

ALPHONSE F. ANJESKEY.